Oct. 1, 1957 R. CANTZ ET AL 2,808,505

CONSTANT-GAIN AMPLIFIER SYSTEM

Filed Jan. 12, 1953 2 Sheets-Sheet 1

INVENTORS
Alfred Nowak and
Rudolf Cantz
BY Michael S. Striker
agt.

Oct. 1, 1957 R. CANTZ ET AL 2,808,505

CONSTANT-GAIN AMPLIFIER SYSTEM

Filed Jan. 12, 1953 2 Sheets-Sheet 2

INVENTORS
Alfred Nowak and
Rudolf Cantz
BY Michael S. Striker
att.

United States Patent Office 2,808,505
Patented Oct. 1, 1957

2,808,505

CONSTANT-GAIN AMPLIFIER SYSTEM

Rudolf Cantz, Ulm (Danube), and Alfred Nowak, Hannover, Germany, assignors to Telefunken Gesellschaft fuer drahtlose Telegraphie G. m. b. H., Hannover, Germany Application January 12, 1953, Serial No. 330,636

14 Claims. (Cl. 250—20)

Our invention relates to amplifier systems of the type wherein it is desired to have a constant gain, the magnitude of this gain per stage being only of secondary importance.

It is an object of our invention to provide means for maintaining constant the gain of an amplifier stage by making it independent from changes in tube transconductance due to such factors as variations in emissivity or operating voltages.

It is another object of this invention to provide a circuit arrangement adapted to afford constancy of gain irrespective of aging or replacement of an amplifier tube.

Still another object of the present invention is to provide means for insuring a substantially invariable effective grid-plate transconductance, or mutual conductance, in systems wherein the internal resistance of a vacuum tube is critical and wherein such transconductance is a factor co-determining said internal resistance. Such is the case where the Q of an input and/or output circuit associated with the tube is to remain constant, a typical instance being a mixer stage having feedback means for the deattenuation of an intermediate-frequency circuit.

A further, more specific object of this invention, allied with the preceding one, is to modify a conventional amplifier circuit (e. g. a mixer stage) in such manner as to obtain the desired constancy of gain and/or internal resistance without the use of additional circuit elements.

The invention realizes the foregoing objects, and others that will subsequently appear, by the provision of means for so feeding back output voltage to the input circuit of an amplifier tube as to result in a dynamic tube characteristic whose slope is substantially unaffected by changes in the static transconductance of the tube. This feedback may be effected by additively superimposing upon the input voltage an auxiliary oscillation generated by the same tube electrodes as are used for amplifying the input signal, the amplitude of this oscillation being large enough to pass through portions of appreciably different slope of the associated transfer characteristics, i. e. to extend into the lower-bend region of these characteristics. More particularly, this auxiliary oscillation may serve as the heterodyning frequency of a mixer stage embodying the invention. Advantageously, the auxiliary oscillation will have a frequency lying outside the band of signal frequencies to be passed by the tube, preferably a frequency higher than twice the highest modulation frequency or audio frequency in the case of R. F. or A. F. input, respectively, in order to avoid the generation of beat frequencies within the operating frequency range.

Figure 1:
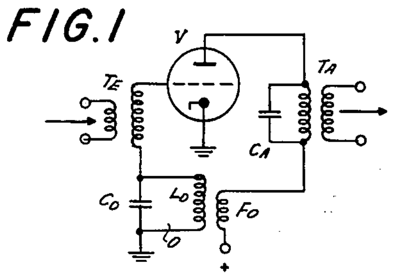
Figure 2:
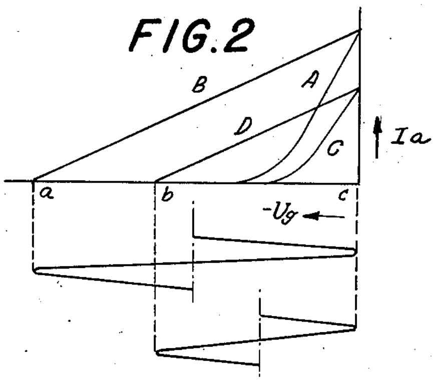
Figure 5:
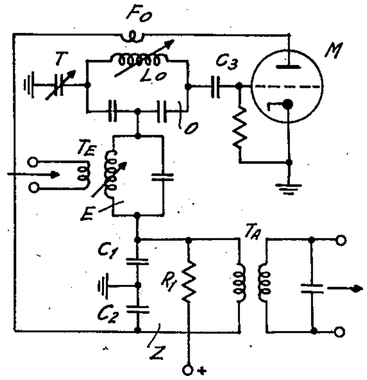
Figure 6:
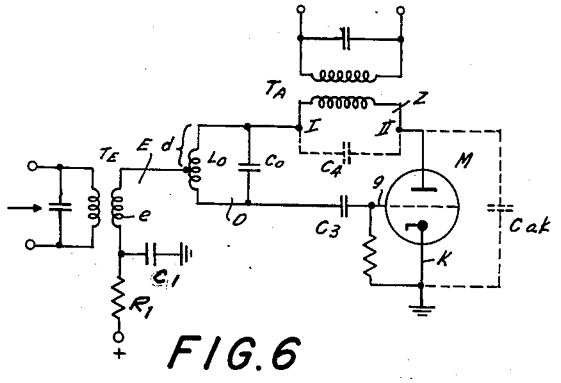
Figure 7:
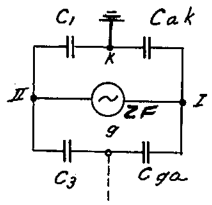

The invention will be more fully understood from the following detailed description of certain embodiments, reference being had to the accompanying drawing in which:

Fig. 1 is a circuit diagram of a first embodiment of the invention;

Fig. 2 provides a graphical representation of tube characteristics illustrating the operation of the system of Fig. 1; and Figs. 3–9 are circuit diagrams illustrating further embodiments of the invention, Fig. 7 representing an equivalent circuit of part of the system of Fig. 6.

Fig. 1 shows a vacuum tube V with grounded cathode, an input transformer $T_E$ having its secondary connected between the grid of tube V and ground, and an output transformer $T_A$ having its primary connected between the anode or plate of tube V and positive battery. According to the invention, an oscillatory circuit O comprising a capacitance $C_0$ and an inductance $L_0$ is inserted between ground and the secondary of input transformer $T_E$, the inductance $L_0$ being regeneratively coupled to a feedback coil $F_0$ connected in the plate circuit of the tube. Output transformer $T_A$ is bypassed for the auxiliary oscillation from circuit O by a condenser $C_A$.

Fig. 2 shows the plate current I of tube V plotted against the grid voltage $-U_g$ thereof. If a tube has the transfer characteristic indicated by the graph A it will have a dynamic characteristic indicated by the straight line B. With such a large amount of plate current, $I_a$, the oscillatory circuit provides oscillations due to the large plate current which have a large amplitude *a—c*. On the other hand, if the tube is replaced by a second tube in the mixing circuit which has a transfer characteristic C, then the dynamic characteristic of the tube can be represented by the straight line D. With this second transfer characteristic it is clear that the plate current of the tube is substantially smaller than the plate current of the first tube. This is automatically compensated by the circuit incorporating the principles of the present invention by the oscillatory circuits which now oscillates at a lower amplitude *b—c* so that the two dynamic characteristics B and D remain parallel to one another.

Figures 3, 4:
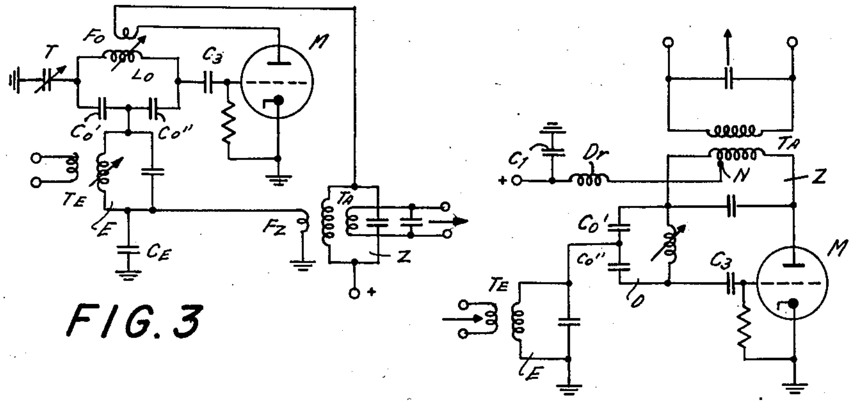

Figs. 3–9 show the principles of our invention applied to a mixer stage comprising a vacuum tube M, an oscillatory circuit O generating the heterodyning frequency, and an intermediate-frequency circuit Z. These circuit arrangements are of particular interest for ultra-high-frequency receivers wherein additive mixing in a triode is preferred on account of the low noise level. They suffer, however, from the drawback of considerable damping of the intermediate-frequency circuit by the triode. Thus it was found, in a typical case, that the resistance of the circuit Z at resonance was only about 2 to 4 kiloohms, hence considerably less than the anticipated resistance of the oscillating tube calculated at about 15 kiloohms. Closer analysis has shown this excessive damping to be due to the plate reaction causing a portion of the intermediate frequency to reach the grid via the grid-plate capacitance. This effect can be compensated by a deattenuation circuit which in Fig. 3 is shown to comprise a regenerative feedback coil $F_Z$ coupled to the primary of output transformer $T_A$ and connected across an input condenser $C_E$ lying in series with the tuned input circuit E. If, however, the mixer tube M were energized from a separate source of heterodyning frequency, the damping due to the internal resistance would be a function of the grid-plate transconductance, the plate current $I_a$ being given by the formulas $$I_a = \frac{SU}{1R_p/R_{i'}} \text{ and } R_{i'} = \frac{R_i}{1K/D}$$

wherein S is the slope of the dynamic tube characteristic, U is the exciting voltage, $R_p$ is the load resistance of the plate circuit, $R_{i'}$ is the apparent internal tube resistance with feedback, $R_i$ is the internal tube resistance without feedback, K is the coupling factor of the feedback circuit and D is the durchgriff, or ratio of plate-cathode capacitance to grid-cathode capacitance, of the tube M. In conventional systems, therefore, variations of the slope S due to any of the aforesaid causes will affect the apparent internal resistance of the tube M and, thereby, the attenuation of the intermediate-frequency circuit Z. If, however, in accordance with this invention the heterodyning frequency is generated by the electrodes of the tube M itself, then the slope of the dynamic characteristic will remain constant as explained in connection with Figs. 2*a* and 2*b*, hence the circuit Z will have an invariable Q and a stable band width.

Fig. 3 further shows the input circuit E decoupled from the oscillatory circuit O by being connected in the diagonal of a bridge formed by the two condensers $C_{0'}$, $C_{0''}$ of the circuit O, a trimmer condenser T and the grid condenser $C_3$ in series with the grid-cathode capacitance of the tube M. The feedback coil $F_Z$, which is here shown connected in the grid circuit, could also be connected in the cathode circuit of the tube; it is shunted to ground for incoming signal frequencies by the condenser $C_E$.

The special feedback coil $F_Z$ for the deattenuation of the intermediate-frequency circuit Z can be dispensed with if this circuit is included in a split-reactance connection as shown in the subsequent figures. Fig. 4 illustrates a split-inductance network, similar to the tank circuit of a Hartley oscillator, the intermediate-frequency circuit Z having one terminal connected to the plate of tube M and the other to its grid by way of the oscillatory circuit O and the condenser $C_3$; plate current is supplied to the tube over an anode filter, comprising a high-frequency choke D*r* and a bypass condenser $C_1$, and over a tap N so positioned on the inductance of circuit Z as to furnish the desired degree of deattenuation without exciting oscillations. It will be noted that the heterodyning circuit O, being decoupled as in Fig. 3 from the input circuit E, also forms part of a split-reactance network having the junction of its condensers $C_{0'}$, $C_{0''}$ connected to the cathode of tube M in the manner of a Colpitts oscillator.

Fig. 5 differs from Fig. 4 by the substitution of a split-capacitance (Colpitts) type of connection for the split-inductance (Hartley) type shown in Fig. 4. The junction of condensers $C_1$, $C_2$ in the intermediate-frqeuency circuit Z is connected through ground to the cathode of tube M; the lower terminal of circuit Z is connected to the plate of the tube in series with feedback coil $F_0$, its upper terminal being connected to the grid by way of circuits E and O as well as the condenser $C_3$. The latter terminal is also connected to positive potential over a resistor $R_1$, the condenser $C_1$ of circuit Z thus forming part of the plate filter along with the inductance of this circuit (the primary of output transformer $T_A$) which replaces the choke D*r* of Fig. 4.

In Fig. 6 the oscillatory circuit O is connected in the manner of a split-inductance (Hartley) circuit; the intermediate-frequency circuit Z is of the split-capacitance type also employed in Fig. 5, this however being not immediately apparent. In this embodiment the left-hand terminal I of circuit Z (corresponding to the lower terminal of that circuit in Fig. 5) is connected to the cathode (ground) by way of the portion *d* of the inductance $L_0$, the secondary *e* of the input transformer $T_E$ and the condenser $C_1$, the impedance of both inductances *d*, *e* for intermediate frequencies being negligible; the opposite terminal II is connected to the cathode by way of the plate-cathode capacitance $C_{ak}$ of tube M which thus replaces the condenser $C_2$ of Fig. 5. The secondary *e* also forms part of the plate inductance represented in Fig. 4 by the choke D*r*, its junction with bypass condenser $C_1$ being connected to positive potential via resistor $R_1$. The capacitive branch of the circuit Z is formed in Fig. 6 by the grid-plate capacitance $C_{ga}$ in series with condensers $C_3$ and $C_0$, yet a supplementary condenser $C_4$ may be connected across the primary of the primary of transformer $T_A$ if desired.

It will thus be seen that in the embodiment of Fig. 6 no additional circuit elements are required to furnish the feedback necessary for the excitation of circuit O and for the deattenuation of circuit Z; it should be noted, however, that this will be true only for an unusual dimensioning of the capacitances $C_1$, $C_3$, $C_{ak}$ and $C_{ga}$ as will be apparent from the equivalent circuit of Fig. 7. In this figure the generator ZF represents the intermediate-frequency circuit Z, the position of the cathode and the grid of tube M being indicated at *k* and *g*, respectively. The condenser $C_0$ has been omitted in Fig. 7 because of the low shunting impedance of inductance $L_0$.

In the simplified circuit of Fig. 7 the generator ZF is connected across the diagonal of a bridge whose arms are the four capacitances mentioned above. When these capacitances are so dimensioned that the cathode *k*, at the junction of arms $C_1$ and $C_{ak}$, is conjugate with respect to the grid *g* at the junction of arms $C_3$ and $C_{ga}$, the intermediate frequency impressed between the terminals I and II will not produce any potential difference between the grid and the cathode of tube M, hence the plate reaction across the grid-anode capacitance $C_{ga}$ will be without effect. As a result, the inner resistance of the tube M will have the same value as it would have without the generation of an intermediate frequency, such as the value of 15 kiloohms calculated for a tube oscillating only with the heterodyning frequency of circuit O. If, for example, the capacitances $C_{ak}$, $C_3$ and $C_{ga}$ are assumed to be of 10, 30 and 2 pf., respectively, then for a balanced bridge the condenser $C_1$ will have to be of a capacitance of $10.30/2=150$ pf. According to conventional practice one could expect the use of a condenser of, say, 500 pf. at $C_1$, which would unbalance the bridge of Fig. 7 (point *k* displaced electrically to the left of point *g*) in such manner as to produce negative feedback; this feedback is minimized in accordance with the invention by a reduction in the size of the condenser $C_1$ so as to result in a deattenuation. Further reduction in the capacitance of condenser $C_1$, beyond the value required for a balanced bridge, will shift the point *k* electrically to the right of point *g*, thereby producing a positive feedback overcompensating the degenerative effect of the aforesaid plate reaction; this increases the apparent internal resistance of tube M. The tube resistance becomes infinite when the driving effect of the plate voltage swing is neutralized, i. e. when the driving voltage (defined as the sum of grid voltage swing and plate voltage swing multiplied by the durchgriff, or reverse amplification factor) goes to zero; in that case the intermediate-frequency circuit Z will have only its natural resistance at resonance. Still further reduction of the capacitance $C_1$ will cause the resonance resistance of this circuit to rise beyond the last-mentioned value, i. e. the apparent tube resistance as seen from the intermediate-frequency circuit will be negative.

With circuit arrangements such as those shown in Figs. 4 and 6, wherein the tank circuit of an oscillating mixer tube is connected in the Hartley or Colpitts "split-reactance" fashion, there occurs a further phenomenon for which the expression "reverse mixing" is here proposed. The combined heterodyning and intermediate-frequency voltage impressed upon the grid and the plate gives rise to beats of input frequency in the plate circuit, this frequency passing through the input circuit E which is conjugate to the tuned circuit O. The result of this plate current will be a feedback of input frequency which will be either positive or negative, depending upon the phase of the intermediate-frequency driving voltage (as above defined). By this "reverse mixing" the Q of the input circuit E is modified in such manner as to cause either a peak or a dip, extending over a frequency range equal to the bandwidth of the I. F. circuit Z, in the resonance curve of the input circuit, thereby either increasing or decreasing the overall effective gain of the mixer stage. Analysis has shown that the "reverse mixing" will be positive, i. e. of a gain-increasing character, under the very circumstances which cause a damping of the intermediate-frequency circuit by the internal resistance of the tube. It will, accordingly, be preferable not to drive the deattenuation of the circuit Z beyond the point at which the internal tube resistance becomes infinitely large, inasmuch as further deattenuation will cause the "reverse mixing" to be of negative sign. Thus it will generally be desirable to choose a minimum attenuation such as to maintain the internal resistance at its normal value for an oscillating tube without intermediate-frequency formation; between this value and infinity the advantage of positive "reverse mixing" will be obtained, yet the resistance of the I. F. circuit Z at resonance will not be unduly small. Also, at some intermediate point between these two limiting values the gain of the mixer stage will be a maximum.

Figure 8:
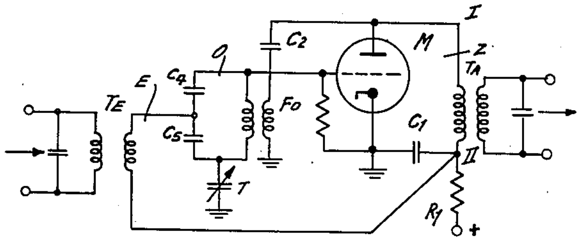

Fig. 8 illustrates another embodiment of the invention which is similar to that of Fig. 6 in that the intermediate-frequency circuit Z is connected as a split-capacitance network without additional circuit elements; feedback for the oscillatory circuit O, however, is here obtained with the aid of a coil $F_0$. The capacitive voltage divider of the I. F. circuit is again formed by two condensers designated $C_1$ and $C_2$, as in Fig. 5. Feedback coil $F_0$ is here inserted in the I. F. circuit Z, between ground and the condenser $C_2$, in order to obviate the loading of the grid-plate capacitance by the parallel capacitance between coils $L_0$ and $F_0$ which occurs in the arrangements of Figs. 3 and 5. The capacitive bridge arm represented by condenser $C_3$ in Fig. 7 is here formed by the parallel connection of the two capacitances $C_4$ and $C_5$ of the oscillatory circuit O. Whereas ordinarily the lower terminal of the secondary of input transformer $T_E$ would be grounded, this terminal has been connected in accordance with a feature of the invention to terminal II of the I. F. circuit Z in order to establish the equivalent circuit of Fig. 7. With condensers $C_2$, $C_4$, and $C_{ga}$ having the assumed values of 30, 10, 20 and 2 pf., respectively, the bridge will again be balanced if condenser $C_1$ is given a capacitance of 450 picofarads.

The aforementioned reduction in the effective grid-plate capacitance due to the connection disclosed in Fig. 8 enables the use of smaller capacitances $C_4$ and $C_5$ which is advantageous for the dimensioning of the input circuit E. It will be noted that in this embodiment the circuit E is connected to the midpoint of the capacitive branch of the tuned circuit O, in contradistinction to Fig. 6 where it was connected to a tap on the inductive branch. It may be mentioned that in the embodiment of Fig. 8 a small portion of the I. F. output is fed back to the grid circuit of tube M by the coil $F_0$; this feedback, however, can be readily taken into account in the dimensioning of the deattenuation circuit.

Figure 9:
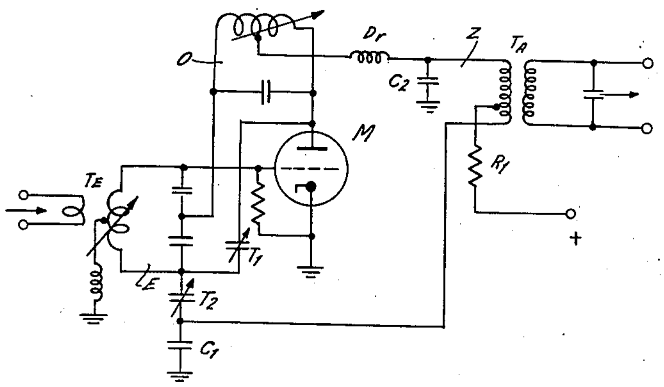

Fig. 9, finally, illustrates an embodiment wherein conjugacy between the input circuit E and the oscillatory circuit O is obtained by connecting the latter across a bridge diagonal of the circuit E intsead of connecting it to a tap on a branch of the former. This connection is designed to prevent noise currents from the plate circuit from passing through the input circuit and increasing the noise level thereof. The necessary balancing of the input circuit is accomplished with the aid of two trimmer condensers $T_1$, $T_2$. Condenser $T_1$ lies between the plate of tube M and the lower terminal of circuit E whose upper terminal is connected to the grid of the tube; condenser $T_2$ is inserted between the lower terminal of circuit E and the grounded condenser $C_1$ which together with condenser $C_2$, as in preceding embodiments forms the capacitive voltage divider of the split-capacitance deattenuating network for the intermediate-frequency circuit Z.

The invention is, of course, not limited to the specific embodiments described and illustrated but is, on the contrary, capable of numerous modifications and adaptations without departing from the spirit and scope of the appended claims.

We claim:

1. An amplifier and mixer stage comprising in combination, a triode with only an anode, a cathode and a control grid and having an anode-cathode circuit and a grid-cathode circuit, a signal input circuit and an oscillatory circuit connected in said grid-cathode circuit, said oscillatory circuit being tuned to a heterodyning frequency, an intermediate-frequency circuit in said anode-cathode circuit, first regenerative feedback means between said anode-cathode circuit and said oscillatory circuit exciting the latter to generate said heterodyning frequency, and second regenerative feedback means between said anode-cathode circuit and said grid-cathode circuit adapted to deattenuate said intermediate-frequency circuit by increasing the apparent internal resistance of said tube.

2. An amplifier and mixer stage comprising in combination, a triode having a cathode, a grid and an anode, an input circuit connected between said grid and said cathode, said input circuit including a source of signals and an oscillatory circuit coupled to said grid, said oscillatory circuit being tuned to a heterodyning frequency, an output circuit connected to said anode including an intermediate-frequency circuit, first regenerative means feeding back energy from said output circuit to said oscillatory circuit, thereby exciting the latter to generate said heterodyning frequency, and second regenerative means between said intermediate-frequency circuit and said input circuit feeding back enough energy to increase the apparent internal resistance of said tube, as seen from said intermediate-frequency circuit, to a value greater than normal but less than infinity.

3. An amplifier and mixer stage comprising in combination, a triode having a cathode, a grid and an anode, an input circuit connected between said grid and said cathode, said input circuit including a source of signals and an oscillatory circuit coupled to said grid, said oscillatory circuit being tuned to a heterodyning frequency, an output circuit connected to said anode including an intermediate-frequency circuit, first regenerative means feeding back energy from said output circuit to said oscillatory circuit, thereby exciting the latter to generate said heterodyning frequency, and second regenerative means between said intermediate-frequency circuit and said input circuit feeding back enough energy to increase the apparent internal resistance of said tube, as seen from said intermediate-frequency circuit, substantially to infinity.

4. An amplifier and mixer stage comprising in combination, a triode having a cathode, a grid and an anode, an input circuit connected between said grid and said cathode, said input circuit including a source of signals and an oscillatory circuit coupled to said grid, said oscillatory circuit being tuned to a heterodyning frequency, an output circuit between said anode and said cathode including an intermediate-frequency circuit, first regenerative means feeding back energy from said output circuit to said oscillatory circuit, thereby exciting the latter to generate said heterodyning frequency, and second regenerative means between said intermediate-frequency circuit and said input circuit feeding back enough energy to make the apparent internal resistance of said tube negative as seen from said intermediate-frequency circuit.

5. An amplifier and mixer stage comprising in combination, a triode with only an anode, a cathode and a control grid and having an anode-cathode circuit and a grid-cathode circuit, a signal input circuit and an oscillatory circuit connected in said grid-cathode circuit, said oscillatory circuit being tuned to a heterodyning frequency, an intermediate-frequency circuit in said anode-cathode circuit, regenerative feedback means between said anode-cathode circuit and said oscillatory circuit exciting the latter to generate said heterodyning frequency, and a feedback coil included in said grid-cathode circuit and regeneratively coupled to said intermediate-frequency circuit to deattenuate the latter.

6. An amplifier and mixer stage comprising in combination, a triode with only an anode, a cathode and a control grid and having a grid-cathode circuit and an anode-cathode circuit, a signal input circuit and an oscillatory circuit effectively serially connected in conjugate relation in said grid-cathode circuit, said oscillatory circuit being tuned to a heterodyning frequency, an intermediate-frequency circuit in said anode-cathode circuit, first regenerative feedback means between said anode-cathode circuit and said oscillatory circuit exciting the latter to generate said heterodyning frequency, and second regenerative feedback means between said anode-cathode circuit and said grid-cathode circuit adapted to deattenuate said intermediate-frequency circuit by increasing the apparent internal resistance of said tube.

7. An amplifier and mixer stage comprising in combination, a triode tube having a cathode, a grid and an anode, an input circuit connected between said grid and said cathode, said input circuit including a source of signals and an oscillatory circuit coupled to said grid, said oscillatory circuit being tuned to a heterodyning frequency, regenerative means so connecting said oscillatory circuit to said anode as to feed back sufficient energy to generate said heterodyning frequency in said oscillatory circuit, an intermediate-frequency circuit, and circuit means establishing a split-reactance connection between said intermediate-frequency circuit and said grid and said cathode of said triode, said connection being so balanced as to provide enough regenerative feedback to deattenuate said intermediate-frequency circuit.

8. An amplifier and mixer stage comprising in combination, a triode having a cathode, a grid and an anode, an input circuit connected between said grid and said cathode, said input circuit including a source of signals and an oscillatory circuit, said oscillatory circuit being tuned to a heterodyning frequency, regenerative means so connecting said oscillatory circuit to said anode as to feed back sufficient energy to generate said heterodyning frequency in said oscillatory circuit, an intermediate-frequency circuit having an inductive and a capacitive branch and being effectively connected in parallel between said grid and said anode, and circuit means connecting an intermediate point of one of said branches to said cathode, thereby establishing a split-reactance connection so balanced as to provide enough regenerative feedback to deattenuate said intermediate-frequency circuit.

9. An amplifier and mixer stage comprising in combination, a triode having a cathode, a grid and an anode, an input circuit connected between said grid and said cathode, said input circuit including a source of signals and an oscillatory circuit, said oscillatory circuit being tuned to a heterodynng frequency, regenerative means so connecting said oscillatory circuit to said anode as to feed back sufficient energy to generate said heterodyning frequency in said oscillatory circuit, an intermediate-frequency circuit having an inductive and a capacitive branch and being effectively connected in parallel between said grid and said anode, and circuit means connecting an intermediate point of said inductive branch to said cathode, thereby establishing a split-reactance connection so balanced as to provide enough regenerative feedback to deattenuate said intermediate-frequency circuit.

10. An amplifier and mixer stage comprising in combination, a triode having a cathode, a grid and an anode, an input circuit connected between said grid and said cathode, said input circuit including a source of signals and an oscillatory circuit, said oscillatory circuit being tuned to a heterodyning frequency, regenerative means so connecting said oscillatory circuit to said anode as to feed back sufficient energy to generate said heterodyning frequency in said oscillatory circuit, an intermediate-frequency circuit having an inductive and a capacitive branch and being effectively connected in parallel between said grid and said anode, and circuit means connecting an intermediate point of said capacitive branch to said cathode, thereby establishing a split-reactance connection so balanced as to provide enough regenerative feedback to deattenuate said intermediate-frequency circuit.

11. An amplifier and mixer stage comprising in combination, a triode having a cathode, a grid and an anode, an input circuit connected between said grid and said cathode, said input circuit including a source of signals and an oscillatory circuit coupled to said grid, said oscillatory circuit being tuned to a heterodyning frequency, regenerative means so connecting said oscillatory circuit to said anode as to feed back sufficient energy to generate said heterodyning frequency in said oscillatory circuit, an intermediate-frequency circuit having an inductive and a capacitive branch and being effectively connected in parallel between said grid and said anode, a source of direct current connected to said anode, filter means between said current source and said anode, first condenser means in said capacitive branch common to said intermediate-frequency circuit and to said filter means, second condenser means in said capacitive branch between said first condenser means and said anode, and circuit means connecting a portion of said capacitive branch intermediate said first and second condenser means to said cathode, thereby establishing a split-reactance connection so balanced as to provide enough regenerative feedback to deattenuate said intermediate-frequency circuit.

12. An amplifier and mixer stage comprising in combination, a triode having a cathode, a grid and an anode, said anode and said cathode having an anode-cathode capacitance therebetween, an input circuit connected between said grid and said cathode, said input circuit including a source of signals and an oscillatory circuit coupled to said grid, said oscillatory circuit being tuned to a heterodyning frequency, regenerative means so connecting said oscillatory circuit to said anode as to feed back sufficient energy to generate said heterodyning frequency in said oscillatory circuit, an intermediate-frequency circuit having inductance means effectively connected between said grid and said anode and condenser means connecting the grid side of said inductance means to said cathode, the anode side of said inductance means being connected to said cathode by means of said anode-cathode capacitance of said tube, said condenser means and said anode-cathode capacitance of said tube thus forming a split-reactance network so balanced as to provide enough regenerative feedback to deattenuate said intermediate-frequency circuit.

13. An amplifier and mixer stage comprising in combination, a triode having a cathode, a grid and an anode, an input circuit connected between said grid and said cathode, said input circuit including a source of signals and an oscillatory circuit, said oscillatory circuit being tuned to a heterodyning frequency, a feedback coil connected to said anode and regeneratively coupled to said oscillatory circuit, thereby exciting the latter to generate said heterodyning frequency, an intermediate-frequency circuit having inductance means connected between said grid and said anode, first condenser means connecting the grid side of said inductance means to said cathode, and second condenser means connecting the anode side of said inductance means to said cathode, said second condenser means being serially connected between said anode and said feedback coil, said first and second condenser means forming a split-reactance network so balanced as to provide enough regenerative feedback to deattenuate said intermediate-frequency circuit.

14. An amplifier and mixer stage comprising in combination, a triode having an anode-cathode circuit and a grid-cathode circuit, a bridge circuit in said grid-cathode circuit, a source of signals connected across one diagonal of said bridge circuit, an oscillatory circuit in said grid-cathode circuit connected across the other diagonal of said bridge circuit, said oscillatory circuit being tuned to a heterodyning frequency, an intermediate-frequency circuit in said anode-cathode circuit, first regenerative means feeding back energy from said anode-cathode circuit to said oscillatory circuit, thereby exciting the latter to generate said heterodyning frequency, and second regenerative means between said intermediate-frequency circuit and said grid-cathode circuit feeding back enough energy to deattenuate said intermediate-frequency circuit.

References Cited in the file of this patent

UNITED STATES PATENTS

| | | |
|---|---|---|
| 1,997,393 | Roberts | Apr. 9, 1935 |
| 2,049,777 | Mountjoy | Aug. 4, 1936 |
| 2,053,414 | Barden | Sept. 8, 1936 |
| 2,107,395 | Schlesinger | Feb. 8, 1938 |
| 2,323,250 | Smith | June 29, 1943 |
| 2,432,183 | Van Slooten | Dec. 9, 1947 |
| 2,631,229 | Chesus | Mar. 10, 1953 |